Leon S. Yaggy,
INVENTOR.

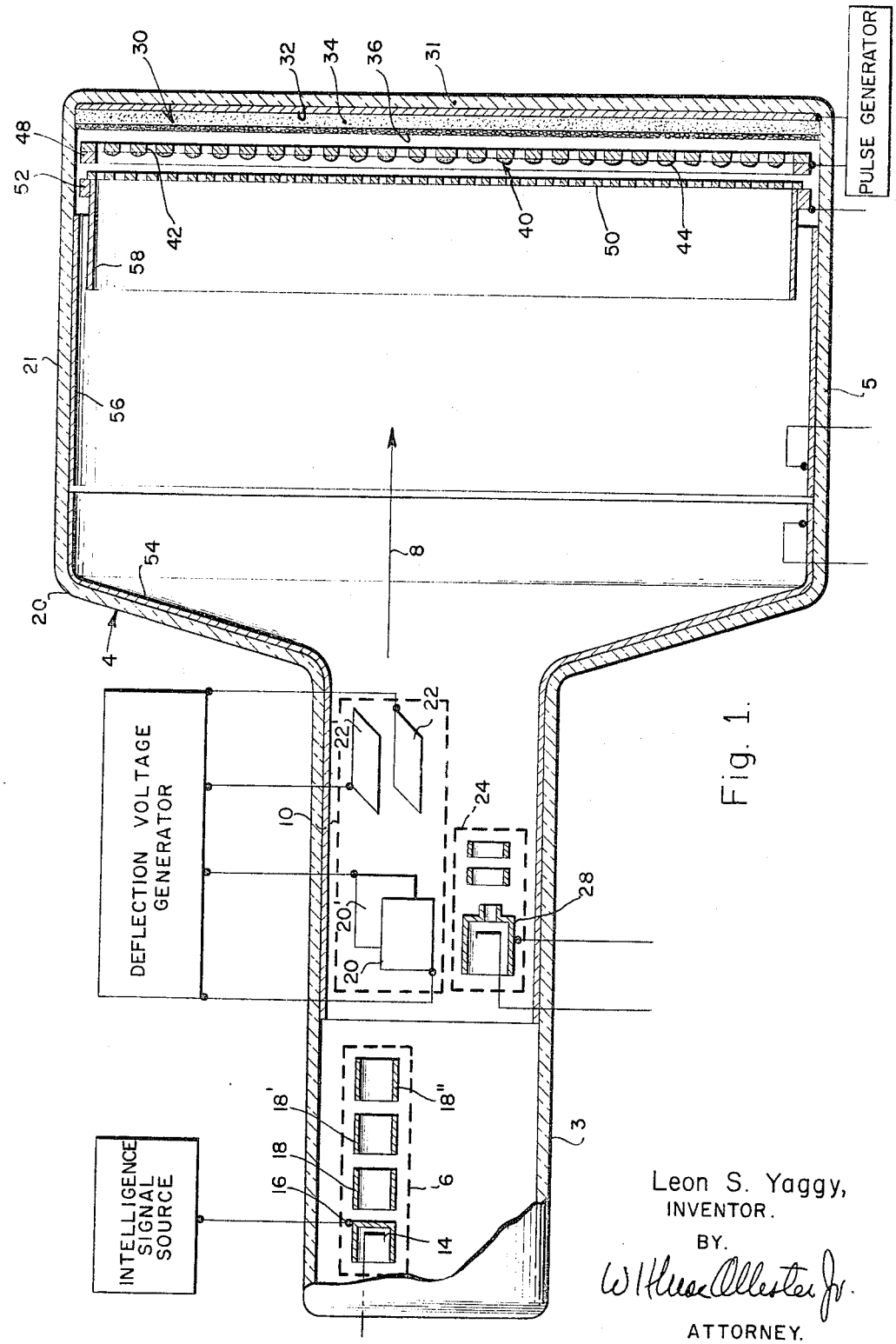

United States Patent Office 3,284,652
Patented Nov. 8, 1966

3,284,652
DISPLAY SCREEN ADJACENT STORAGE TARGET COMPRISING PHOSPHOR, LEAKY DIELECTRIC AND TRANSPARENT CONDUCTIVE LAYERS
Leon S. Yaggy, Carlsbad, Calif., assignor to Hughes Aircraft Company, Culver City, Calif., a corporation of Delaware
Filed Oct. 28, 1963, Ser. No. 319,095
5 Claims. (Cl. 313—68)

This invention relates to cathode ray tubes of the type providing a stored visual display. More particularly the invention relates to cathode ray tubes of the type wherein changing information is visually displayed in lesser or greater brightness than the brightness of the background or unchanging information display.

This function of providing a distinctive visual display representative of changing input information is of considerable utility in systems for detecting moving targets such as in radar and other radio detection or navigation systems. This function is commonly referred to as "fixed target cancellation"; devices, such as the present invention, for achieving such cancellation or distinctive displays are known as "moving target indicators." While this function is of obvious significance in military operations, it is not restricted thereto and is also useful in such applications as air traffic control systems.

Heretofore it has been proposed to achieve "fixed target cancellation" by means of devices capable of storing information, in the form of electrical signals and comparing newly obtained information signals with the stored signals to provide an output signal representative of only the changed or changing information and then apply such output signals to a display device such as a cathode ray tube. A suitable device for this purpose is described by the present inventor in a co-pending application entitled "Moving Target Indicator Tube," Ser. No. 211,536, filed July 23, 1962, and assigned to the instant assignee. In this system at least two cathode ray tubes, one for storing and comparing, and one for displaying are required as well as the circuitry for performing the necessary operations.

It is, therefore, an object of the present invention to provide an improved moving target indicator tube of the visual display tube capable of providing both fixed target cancellation or distinguishment and display of changing information.

Another object of the invention is to provide an improved moving target indicator tube which in itself is capable of providing fixed target cancellation and display of changing target information with a minimum of associated circuitry to accomplish these functions.

Yet another object of the invention is to provide an improved moving target indicator tube having an electrical signal input and a stored visual display.

These and other objects and advantages of the invention are realized by providing a special viewing screen structure adapted to be excited to luminescense by the flood electrons in a cathode ray tube of the direct-viewing storage display type. The viewing screen structure comprises a phosphor layer exposed to impingement of flood electrons after these electrons have penetrated through the storage electrode in accordance with the charge pattern thereon as established by a scanning electron beam (called the "writing" beam) modulated in accordance with information signals. Adjacent this phosphor layer a "leaky" dielectric layer is disposed and between this "leaky" dielectric layer and the faceplate of the tube is disposed a transparent, electrically conductive layer. When flood electrons impinge on the phosphor layer they charge the surface thereof in the negative direction causing a potential drop across the "leaky" dielectric layer. When the potential drop across the "leaky" dielectric layer reaches a value such that the current through this layer equals the electron current moving to the surface of the phosphor layer, an equilibrium condition is reached and the potential of the phosphor surface will not change. By properly adjusting the voltage on the transparent conductive layer, the light output for the highest flood electron current can be made equal to the light output for the lowest flood electron current when equilibrium is reached for each. Thus, when and as long as the information to be displayed at a given point remains unchanged, the equilibrium condition obtains and such information will be displayed at a common, predetermined output level. If, however, the flood electron current changes at a given point (as due to movement of a target, for example) there will be a corresponding change in the light output until the new equilibrium potential is established for that new value of current. Thus, if a target moves, some areas of the display will become lighter because the flood electron current increases at those areas, while other areas will become darker because the flood electron current decreases at these areas. In this manner the presence of only moving targets can be indicated and displayed.

The invention will be described in greater detail by reference to the drawings in which:

FIGURE 1 is a cross-sectional elevational view of a cathode ray tube embodying the invention;

Figure 3:
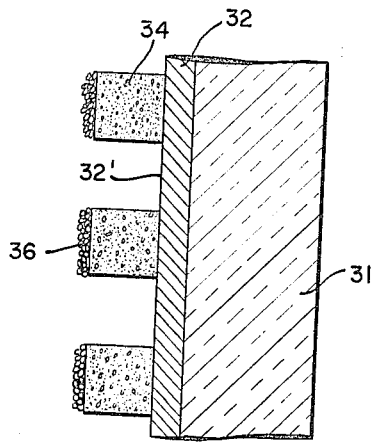
FIGURE 3 is a cross-sectional elevational view of another embodiment of a portion of a viewing target structure according to the invention for use with a tube such as shown in FIGURE 1.

Referring now to FIGURE 1, a fixed target cancellation tube 2 according to the invention is shown comprising an evacuated envelope 4 having a neck portion 3 and an enlarged cylindrical portion 5. Disposed in the neck portion 3 is an electron gun assembly 6 for forming an electron beam 8 of elemental cross-sectional area and a deflection system 10 for deflecting the beam 8 horizontally and vertically. The electron gun assembly 6, hereinafter called the "writing" gun, comprises a cathode 14, a control or intensity grid 16, and beam focusing and accelerating electrodes 18, 18', and 18". The gun assembly 6 may be of conventional and well-known design and further detail description of the structure and operation thereof is not deemed necessary herein. While an electrostatic deflection system 10 is shown, this is merely for convenience and an electromagnetic deflection system may be employed to equal advantage as is well-understood in the art. The deflection system 10 shown comprises a pair 20, 20' of horizontal deflecting plates and a pair 22, 22' of vertical deflecting plate.

Likewise disposed in the neck portion 3 of the tube envelope is a flood or viewing electron gun 24 for producing a broad beam of electrons. The flood electron gun 24 comprises a cathode 26 and a grid 28. Additional beam forming electrodes may be included as desired.

Disposed adjacent the faceplate or end-portion of the cylindrical portion 5 is a target assembly comprising a viewing target 30, a storage target 40, and a collector grid 50. The viewing target 30 comprises, according to the invention, a transparent conductive coating 32, a leaky dielectric layer 34, and a phosphor coating 36 disposed in the order named on the inner surface of the flat transparent end portion of the cylindrical end section 5.

The transparent conductive coating 32 may be of tin oxide, for example, and about $10^{-5}$ inches thick. The leaky dielectric layer 34 may be formed of calcium fluoride, for example, and about $10^{-3}$ inches thick. The phosphor coating 36 may comprise any well-known phosphor material capable of being excited under electron bombardment to produce light. It should also be understood that the leaky dielectric layer 34 as well as the conductive layer 32 should be transparent so that the light produced by the phosphor layer 36 may be viewed through the end or faceplate section of the tube.

Adjacent the viewing target 30 is a storage target 40 comprising a screen member 42 which may be of electroformed nickel having, for example, about 250 meshes per inch and a thickness of the order of about 0.001". The outer periphery of the screen 42 may be welded to a support ring 48. A thin layer 44 of secondary electron emissive dielectric material is provided on the side of the screen 42 facing the electron guns in the neck portion 3 of the tube. This layer 44 of dielectric material constitutes a storage surface and is preferably about 20,000 angstroms thick. Such a storage surface may be provided by evaporating magnesium fluoride, for example, under the nickel screen 42.

Disposed adjacent the storage target 40 is a collector grid 50 comprising a thin metal screen mounted on a support ring 52. The collector electrode 50 is disposed between the neck portion 3 of the tube and the storage target 40.

In the operation of the tube, it is desirable that the flood electrons arrive at the storage target 40 at approximately normal incidence. Collimation of flood electrons is effected by means of a collimating lens produced by lens cylinders 54, 56 and 58. The lens cylinders 54 and 56 are coaxially disposed about the inner surface of the cylindrical portion 5 of the tube from the flood electron gun 24 to the collector grid 50. The lens cylinders 54 and 56 may comprise conductive coatings provided, for example, by painting a colloidal suspension of graphite on the inside of the glass envelope. The other collimating lens cylinder 58 may be attached to the inner periphery of the storage ring 52 which also serves to support the collector grid 50. This lens cylinder 58 extends from the ring 52 towards the flood gun 24 and overlaps the right extremity of the lens cylinder 56, as viewed in the drawings.

In operation, the electron beam 8 is caused to scan the storage target assembly 40 in raster fashion by applying appropriate voltages to the cathode 14 and the electrodes of the electron "writing" gun 6 and to the deflecting plates of the deflection system 10. This results in the establishment of a stored charge pattern on the storage surface of the storage target 40. This operation is well-known and it is not deemed necessary to describe the same in great detail herein. By maintaining the storage mesh 42 normally negative with respect to the flood gun cathode 26, no flood electrons can penetrate the storage target. However, when the storage target is scanned by the writing beam 8, which is intensity-modulated in accordance with information-representative signals, the storage surface becomes less negative by the phenomenon of secondary electron emission, the secondary electrons produced by impingement of the writing beam 8 on the storage material 44 being collected by the collector electrode 50. In this fashion, an overall charge pattern corresponding to the information is obtained and this charge pattern controls the passage of flood electrons from the viewing electron gun 24 to the viewing target 30. It should be understood that the potentials capable of being stored range from a uniformly negative "black" value to a uniformly positive "white" value; at intermediate potentials only a portion of the flood electrons pass through the storage target 40 to the viewing target thereby producing intermediate or half-tone shades. It will also be understood that the more positive the potential of stored charges, the more flood electrons per unit area that can pass through the storage target, and in this manner the flood electron current to the viewing target 30 is controlled in accordance with information to be displayed.

By means of a connection to the transparent conductive electrode 32 the viewing target may be initially maintained at a potential of about 3000 volts positive with respect to the flood gun 24. As the flood electrons penetrate the storage target 40 and strike the phosphor layer 36 of the viewing taregt light will be produced at a brightness level corresponding to the intensity of the flood electrons impinging thereon in accordance with the storage pattern on the storage target 40. The flood electrons impinging on the phosphor target 36 charge the surface thereof in a negative direction because the secondary electrons which try to leave the phosphor layer encounter a retarding field which is established by the difference in potentials of the viewing target and the storage mesh such that the storage mesh is negative with regard to the viewing target and causes these secondaries to return to the viewing target surface. When the potential drop across the "leaky" dielectric layer 34 reaches a value such that the current through this layer equals the flood electron current arriving at the phosphor surface, an equilibrium condition is reached and the potential at the phosphor surface will not change For a certain current of flood electrons, the potential drop across the phosphor and "leaky" dielectric layers may be about 2000 volts so that the net potential difference with respect to the flood electrons arriving at the phosphor surface is only about 1000 volts which results in a light output between full brightness and zero brightness. Now, if the flood electron current is reduced to one half of this value the potential drop across the "leaky" dielectric layer will only need to be 1000 volts to achieve equilibrium and the phosphor surface potential will be 2000 volts with respect to the flood gun cathode. The equilibrium brightness will now be the same as before because the increase in phosphor surface potential exactly compensates for the decreases in flood electron current. At intermediate flood electron currents the compensation is not exact but is approximate. Hence, all fixed target information will be displayed at approximately the same light output level. If now the target moves, for example, so that some areas of the display should become lighter or darker, more or less flood electron current will flow to these respective areas of the vewing target to re-establish the equilibrium condition. Hence, as long as a target moves it will be displayed at an appropriate brightness level and all fixed targets will be displayed at a common half-tone brightness.

Figure 2:
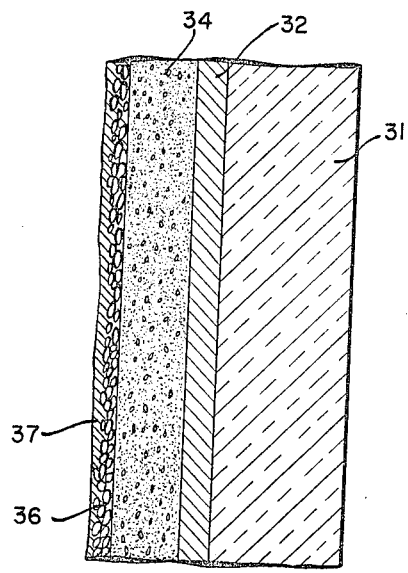
FIGURE 2 is a cross-sectional elevational view of one embodiment of a portion of a viewing target structure according to the invention for use with a tube such as shown in FIGURE 1.

Referring now to FIGURE 2, another form of a suitable viewing target structure according to the present invention is illustrated. As in the viewing target structure shown in FIGURE 1, the transparent conductive electrode 32 may be disposed on the inside surface of the faceplate portion 31 of the tube 4. Disposed over the transparent electrode 32 is a layer 34 of leaky dielectric material also as shown in FIGURE 1. A phosphor layer 36 is disposed over the leaky dielectric layer 34. A thin layer 37 of aluminum, for example, is applied over the exposed surface of the phosphor layer 36. This aluminum layer may be formed by evaporation deposition techniques. By means of this metal layer over the phosphor, the function of brightness v. voltage for constant flood electron current can be made non-linear, so that a larger ratio of maximum to minimum current can be used for equal brightness at equilibrium. In this manner a larger ratio of maximum to minimum instantaneous brightness can be obtained. Referring now to FIGURE 3 another embodiment of a suitable viewing target structure is shown. The purpose of the viewing target shown in FIGURE 3 is to extend the time during which moving targets may be inspected and viewed before they are cancelled. As in previous viewing screen structures a transparent conductive electrode layer 32 is disposed on the inner surface of the faceplate portion 41. However, in the embodiment of FIGURE 3, the leaky dielectric layer 34 is not continuous but is broken up into many small islands. The phosphor layer 36 likewise is disposed on these islands of leaky dielectric material. It will thus be observed by this structure that a bare conductive surface 32′ is provided between the islands of dielectric and phosphor material. The function of this bare conductive surface is to collect secondary electrons from the phosphor. Since many secondary electrons will be collected by this bare area of the electrode 32 the rate of negative charging for the same amount of phosphor excitation of the viewing target will be slower than it would be if no such collecting surface were provided. This slower charging permits more time to view moving targets. For this embodiment the surface of the phosphor must have a secondary emission ratio of less than unity. It may be necessary to apply a thin coating of a low secondary emission material to the phosphor to provide such a ratio.

Since in the moving target indicator direct-view storage tube of the invention there will be a continuous flow of information into the tube some means must be provided to avoid a continuous increase of storage surface potential and hence viewing screen current. A simple expedient is to discharge the storage surface between scans thereof by the writing beam so that for unchanged information the storage surface potential in a given area is the same after one scan as it was after the previous scan. This may be achieved by applying a train of positive-going pulses to the storage mesh 42 so that the flood electrons continually drive the potential in the negative direction to balance the positive charging thereof by secondary emission. Another method of discharging the storage target between scans is by utilizing a storage target such as shown and described in U.S. Patent 3,086,139 to N. H. Lehrer. Such a storage target may be charged positively by a phenomenon of secondary emission by being scanned by a writing beam of a given beam energy and discharged negatively by bombardment induced conductivity by being scanned by a writing beam at a different beam energy. Since it would be desirable to have a continuous flow of information into the tube, the use of two writing guns producing scanning beams of different energy levels is preferred according to incoming information signals and the other for charging in the opposite direction.

What is claimed is:

1. A moving target direct-viewing indicator tube comprising an evacuated envelope containing:
   (A) a storage target adapted to have an electrical charge pattern formed thereon in response to electron bombardment thereof;
   (B) means disposed on a first side of said storage target for forming an electron beam for scanning said storage target therewith in point-to-point fashion to thereby form an electrical charge pattern thereon;
   (C) means disposed on said first side of said storage target for forming a flood electron beam for flooding said storage target therewith;
   (D) and a viewing target disposed on a second side of said storage target and including:
      (1) a phosphor layer on which flood electrons penetrating said storage target impinge;
      (2) a leaky dielectric layer adjacent said phosphor layer;
      (3) and a conductive electrode member adjacent said leaky dielectric layer.

2. A moving target direct-viewing indicator tube comprising an evacuated envelope containing:
   (A) a storage target including a layer of dielectric material thereon capable of having an electrical charge pattern formed thereon by secondary electron emission in response to bombardment thereof by a beam of primary electrons;
   (B) first electron gun means disposed on a first side of said storage target for scanning said dielectric layer on said storage target in point-to-point fashion with a beam of primary electrons;
   (C) second electron gun means disposed on said first side of said storage target for flooding said storage target with a flood beam of electrons;
   (D) and a viewing target disposed on a second side of said storage target and including:
      (1) a phosphor layer on which flood electrons penetrating said storage target impinge;
      (2) a leaky dielectric layer adjacent said phosphor layer;
      (3) and a transparent conductive layer adjacent said leaky dielectric layer.

3. The invention according to claim 2 wherein means for collecting secondary electrons emitted from said dielectric layer on said storage target are disposed between said storage target and said first electron gun means.

4. A moving target direct-viewing indicator tube comprising an evacuated envelope containing:
   (A) a storage target including a layer of dielectric material thereon capable of having an electrical charge pattern formed thereon by bombardment induced conductivity in response to bombardment thereof by a beam of electrons;
   (B) means disposed on a first side of said storage target for forming an electron beam for scanning said dielectric layer on said storage target;
   (C) means disposed on said first side of said storage target for forming a flood beam of electrons for flooding said storage target therewith;
   (D) and a viewing target disposed on a second side of said storage target and including:
      (1) a phopshor layer on which flood electrons penetrating said storage target impinge;
      (2) a leaky dielectric layer adjacent said phosphor layer;
      (3) and a conductive electrode member adjacent said leaky dielectric layer.

5. A moving target direct-viewing indicator tube comprising an evacuated envelope including a faceplate portion and containing:
   (A) a viewing target including:
      (1) a conductive electrode member disposed on said faceplate portion;
      (2) a leaky dielectric layer disposed on said conductive electrode member;
      (3) and a phosphor layer disposed on said leaky dielectric layer;
   (B) a storage target disposed adjacent said viewing target having a layer of dielectric material disposed on a surface thereof opposite to the surface facing said viewing target, said dielectric layer being capable of having an electrical charge pattern formed thereon in response to electron bombardment thereof;
   (C) means forming an electron beam for scanning said dielectric layer on said storage target in point-to-point fashion to thereby form an electrical charge pattern thereon;
   (D) and means forming a flood electron beam for penetrating said storage target with flood electrons in accordance with the electrical charge pattern formed by said dielectric layer thereon.

No references cited.

JAMES W. LAWRENCE, *Primary Examiner.*

R. SEGAL, *Assistant Examiner.*